(No Model.)
R. S. GILLESPIE & H. JAMES.
PIPE WRENCH.
No. 508,302. Patented Nov. 7, 1893.
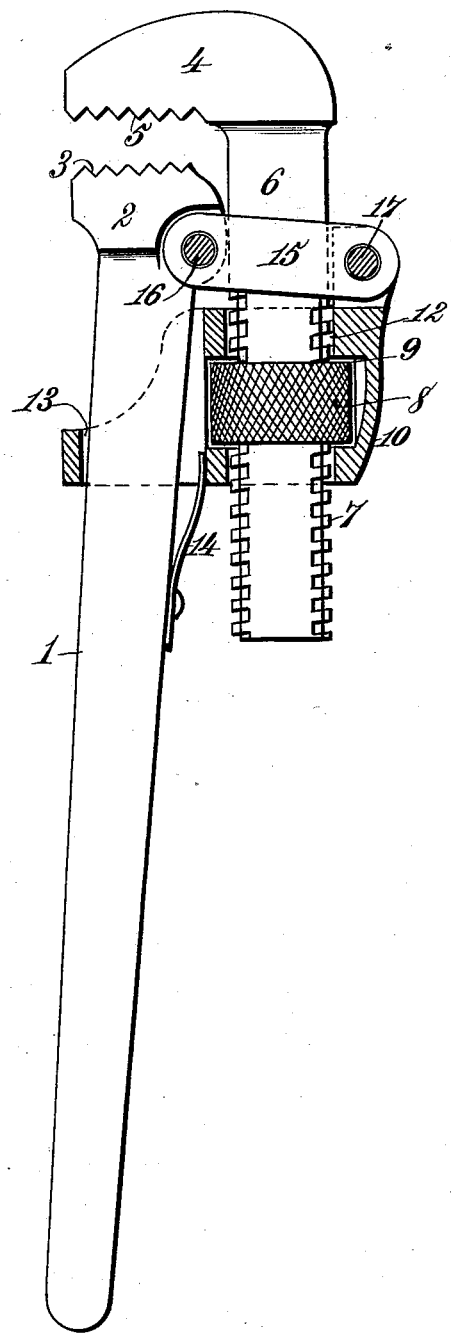
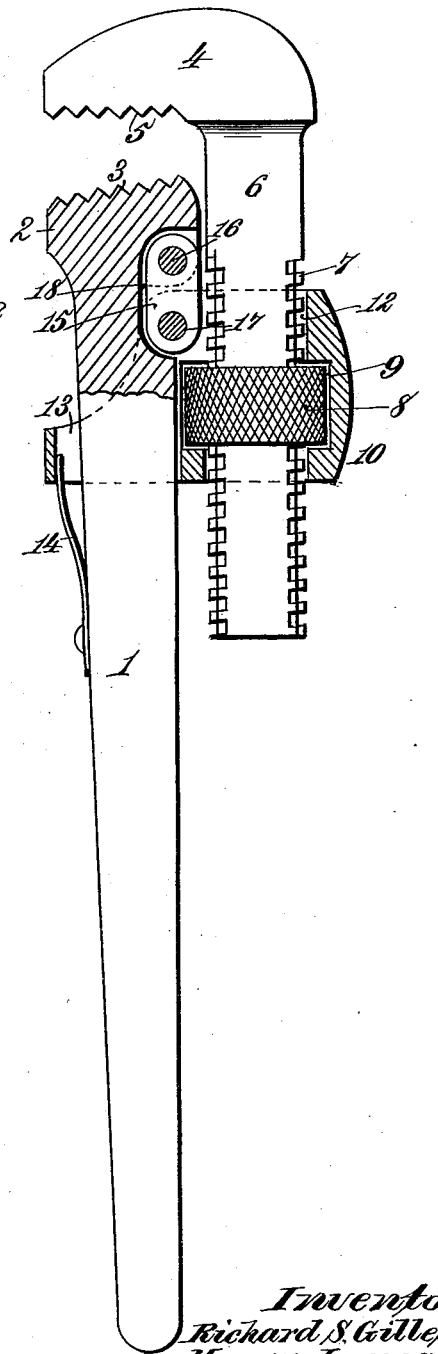
Witnesses:
Robert Errett
G. W. Rea.
Inventors.
Richard S. Gillespie,
Harry James.
By James L. Norris.
Atty.

UNITED STATES PATENT OFFICE.

RICHARD S. GILLESPIE AND HARRY JAMES, OF NEW YORK, N. Y.

PIPE-WRENCH.

SPECIFICATION forming part of Letters Patent No. 508,302, dated November 7, 1893.

Application filed March 28, 1893. Serial No. 467,993. (No model.)

*To all whom it may concern:*

Be it known that we, RICHARD S. GILLESPIE and HARRY JAMES, citizens of the United States, residing at New York city, in the county of New York and State of New York, have invented new and useful Improvements in Pipe-Wrenches, of which the following is a specification.

This invention relates to that type of pipe wrenches wherein a box slidable on a lever handle carries a rotary nut for adjusting the screw-threaded shank of a movable jaw, whereby the pipe or other object gripped between teeth on the movable jaw, and teeth on the end of the lever-handle, will be turned when the wrench is moved or swung in one direction and automatically released to secure a fresh grip when moved or swung in the opposite direction.

The object of our invention is to improve the prior construction, and to provide novel means whereby none of the teeth on the lever-handle will move or roll away from the pipe or object being turned, and a quick and perfect release is obtained on the back stroke to secure a fresh grip.

To accomplish this object our invention consists in the novel construction and combination or arrangement of devices hereinafter described and claimed, reference being made to the accompanying drawings, in which—

Figure 1 is a sectional side elevation of a pipe wrench constructed in accordance with our invention; and Fig. 2 is a similar view showing a modification of the invention.

In order to enable others skilled in the art to make and use our invention we will now describe the same in detail, referring to the drawings, wherein—

The numeral 1 indicates a metallic lever-handle of any form or construction suitable for the conditions required, and provided with a head 2 having a series of transverse teeth 3. The movable jaw 4 of the wrench is provided with transverse teeth 5, and with a shank 6 having a screw-thread 7 which passes through and engages the thread of a screw-nut 8, which is located in a transverse slot 9 of a box 10, all in such manner that by rotating the nut in the proper direction the shank 6 will be moved lengthwise for the purpose of gripping a pipe or other object between the teeth 3 on the head 2 and the teeth 5 on the jaw 4.

The nut-carrying box 10 is provided with a vertical opening 12 for the passage of the screw-threaded shank 6, and with a vertical opening 13 for the passage of the lever-handle 1, and a leaf or other suitable spring 14 exerts a pressure on the lower end of the nut-carrying box to normally hold the latter in the position represented by Fig. 1 of the drawings. The spring 14 is preferably secured to the lever-handle and has its free extremity arranged to bear against a solid part of the box so that the latter can yield. The nut-carrying box is flexibly connected with the head of the lever-handle through the medium of a link 15, one or more, pivotally connected at one end with the lever-handle through the medium of a transverse pivot-pin 16, and pivotally connected at the opposite end with nut-carrying box 10 through the medium of a transverse pivot-pin 17, the construction being such that the pivot-pin 16 constitutes a fulcrum for the lever-handle, while the latter can move longitudinally through the nut-carrying box for the purpose of properly gripping and releasing the pipe or other object.

In the operation of the wrench illustrated in Fig. 1, the lever-handle moves slightly longitudinally in gripping and releasing the pipe, and the nut-carrying box can oscillate or rock on the pivot-pins 16 and 17 as centers.

In the modified construction of Fig. 2 the several parts are constructed substantially as described with reference to Fig. 1 and the reference numerals indicate corresponding parts; but in Fig. 2 the link or links 15 are located vertically in a recess 18 in the lever-handle, and extend substantially parallel with the screw-threaded shank 6. The spring 14 in the modified construction acts upon the oscillating or rocking nut-carrying box to normally hold it in the position indicated in Fig. 2, wherein the screw-threaded shank of the movable jaw is substantially parallel with the lever-handle.

In the practical use of our invention the parts will so adjust themselves in acting upon a pipe or other cylindrical object that the teeth on the lever-handle will not move or roll away from such pipe or other object, while a prompt and perfect release is secured on the back stroke.

Having thus described our invention, what we claim is—

1. The combination with a lever-handle, a movable jaw having a shank, a box having openings for the passage of the lever-handle and shank, and a screw-nut arranged in the box and engaging the shank, of a flexible connection between the lever-handle and the nut-carrying box, composed of a link pivoted at one end to the lever-handle, and at the opposite end to the box, substantially as described.

2. The combination with a lever-handle having teeth at one end, a movable screw shank having a toothed jaw, a box having openings for the passage of the lever-handle and screw shank, and a screw-nut arranged in the box and engaging the screw-shank, of a link pivoted at one end to the lever-handle and at the opposite end to the upper end portion of the box, substantially as described.

In testimony whereof we have hereunto set our hands in presence of two subscribing witnesses.

RICHARD S. GILLESPIE.
HARRY JAMES.

Witnesses:
RANSOM E. WILCOX,
WARREN A. LEONARD.